BEST AVAILABLE COPY
C. W. MILLS.
FLOATING GRAIN-ELEVATOR.
No. 7,588. Reissued April 3, 1877.
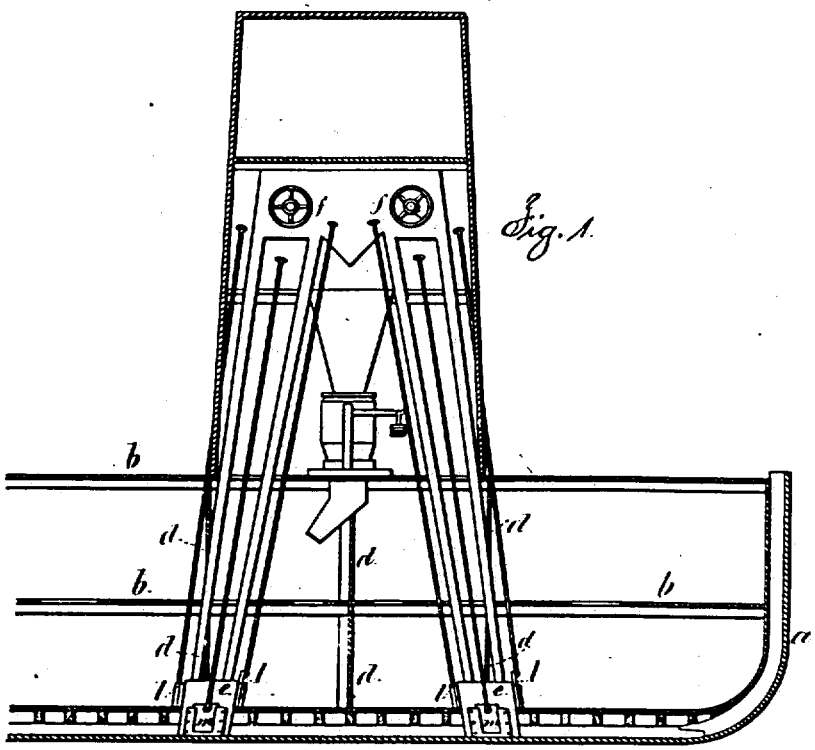
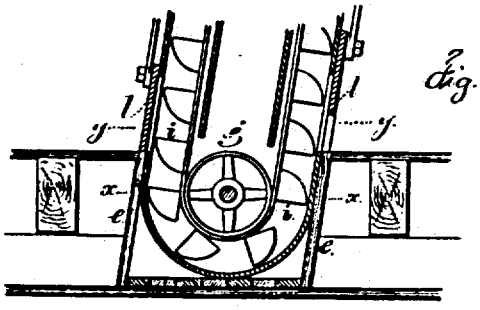
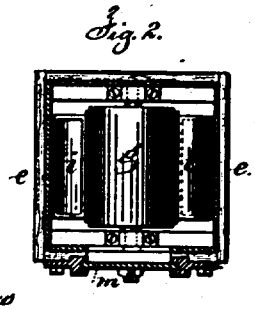
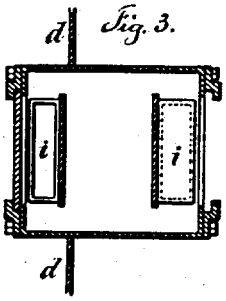
Witnesses
Chas. H. Smith
Geo. T. Pinckney
Inventor
Clark W. Mills.
for Lemuel W. Serrell
atty

UNITED STATES PATENT OFFICE.

CLARK W. MILLS, OF MONT CLAIR, NEW JERSEY.

IMPROVEMENT IN FLOATING GRAIN-ELEVATORS.

Specification forming part of Letters Patent No. 166,02 , dated July 27, 1875; reissue No. 7,588, dated April 3, 1877; application filed February 5, 1877.

*To all whom it may concern:*

Be it known that I, CLARK W. MILLS, of Mont Clair, in the county of Essex and State of New Jersey, have invented an improvement in grain-elevating apparatus fitted permanently into vessels for rendering them self-discharging; and the following is declared to be a correct description of the same:

Grain-elevators have been placed upon a barge or boat, so as to be employed in removing grain from another boat or barge, and transferring the same to steamships and vessels. This process of loading can be carried on very rapidly, but in unloading ships and steam-vessels by the same great difficulty is experienced, because the portable grain-elevator is not adapted to being placed into the larger vessels through their hatchways.

My invention is made for facilitating the removal of grain and similar material, in bulk, from the bins of vessels containing the same, and also for removing water, in case of leakage or accident to the vessel, or for preventing too great accumulation of water if water is admitted to extinguish fire, these operations being performed by the steam or other power upon the vessel itself, instead of employing a separate float with the elevator and the power for operating the same.

The elevator is permanently fitted into the vessel. It passes through the bins, or at the division between or junction of two or more bins, and it passes below the bottoms of the bins, so as to receive the lower pulley of the chain or belt elevator, and the upper portion of this elevator is above the bins, at a sufficient height to allow the grain to be delivered from the vessel into a barge, warehouse, or other receptacle.

The casing of the elevator is provided with openings and slides that are preferably water-tight, like stop-cocks, and there is one of these slides to each bin, so that the grain can be admitted from either one bin or the other; and there is a third opening and slide below the floors of the bins, and these slides are actuated by rods passing up to the deck. By this construction the grain can be removed from one or more bins, and it will run into the buckets freely, and either the bottoms of the bins may be inclined or a man be employed in the bin to push the grain toward the opening, so as to discharge the entire contents of the bins.

The lower pulley of the elevator should be below the lowest bin, and the elevator case or trunk be made water-tight, so that, in cases where the vessel springs a leak or becomes injured, the slides to the grain-bins, remaining tight, exclude water; but, a slide in the lower part of the elevator-case being drawn, the water will pass freely from below the grain-bins into the buckets within the elevator-case, and be raised by the elevator chain or belt, and discharged with great rapidity, so that this apparatus, fitted upon vessels, becomes a great protection in case of accident, as well as a means for rapidly discharging cargo.

In the drawing, Figure 1 is an elevation of the apparatus as fitted into a vessel, a portion of said vessel only being shown. Fig. 2 is a sectional plan at the line *x x*, and Fig. 3 is a similar view at the line *y y*. Fig. 4 is a sectional elevation of the lower part of the elevators. Figs. 2, 3, and 4 are shown in larger size than Fig. 1.

My elevating apparatus may be fitted into any vessel. A portion of the hull is shown at *a*, and portions of the decks at *b*.

The decks may form the bottoms of the grain-bins, or special floors may be constructed. *d d* are the divisions that separate the vessel into compartments or bins.

The elevator-case *e* is, preferably, made of planking laid together, so as to be water-tight. It may extend all the way down from the upper deck to the bottom of the vessel, and into this casing the elevating chain of buckets is placed. It is generally best to make this elevator-case complete, as aforesaid, so that access will be given from above to all parts of the elevating apparatus; but separate trunks for the elevator-chains might be used, as shown in the drawing.

The endless chain or belt *i*, provided with buckets, passes over the drum or pulley at *f*, and is guided at the bottom by the pulley *g*, and the power employed to drive the chain of buckets is connected with the drum at *f*, and may be of any suitable character. The drum *f* is to be at such a height that the grain will be discharged by a spout or trough over or through an opening in the side of the vessel into the receptacle provided therefor.

If there are divisions *d* to form bins in the vessel they will usually be placed at or near the case of the elevator, so that the elevator is between two bins, or it may be at the angle between four bins, and there are openings into the elevator-case, one for each bin, and to each opening there is a sliding gate, *l*, that is, preferably, made water-tight, and fitted with a rod extending up to the deck, so that grain can be admitted from either bin into the elevator to be drawn up and discharged.

The opening into the elevator-case is to be at the level of the floor, so that most of the contents of the bin will run by gravity, and the floor may be inclined to aid this operation; but where the floor of the bin is level the grain that will not run into the elevator is to be pushed or drawn to the opening by hand with a suitable scraper.

Where one bin is above another it is preferable to discharge the bottom one first, and then allow the contents of the upper bin to run through a spout to the opening at the lower bin; and when the grain-bins extend lengthwise of the vessel, two or more short elevators may be used to raise the grain from the end bins, and deliver the same to chutes that convey it to the main elevator, by which it is raised sufficiently to discharge it by a spout from the vessel into lighters or into warehouses.

Below the floor of the lowest bin an opening and slide or gate, *m*, are shown, operated by a rod extending above, so that the grain-elevator can be used for removing water in case of leakage or accident; and, the elevator-case and gates being made water-tight, the grain will be protected from the water that is carried up by the elevator.

This improvement is to be distinguished from elevators that are movable and changed from place to place in removing grain from barges or canal-boats carrying such grain in bulk; and it will be apparent that my improved elevators, fitted permanently into steam-vessels, and provided with separate engines, are always in position to be run, even by the steam that may remain in the boilers after the vessel reaches port.

I am aware that vessels have been made with bins for carrying grain, and also with a permanent trunk or well between the bins, into which a movable elevator-trunk is inserted for removing the grain that is admitted into the the trunk by openings with slides. In this instance the elevator is not a fixture in the grain-holding vessel, and is subject to the objections arising where separate elevators are used.

I claim as my invention—

1. A floating grain-conveying vessel containing grain-receptacles, a vertical, or nearly vertical trunk, having openings leading directly from the bins to the trunk, and provided with slides or gates, and an elevating chain or belt, with buckets, and the pulleys thereof permanently fitted into such grain-conveying vessel, substantially as and for the purposes set forth.

2. A floating grain-conveying vessel provided with an elevator-trunk located between two or more bins, in combination with the elevator chain or belt and its wheels, permanently fitted into such trunk, and slides or gates to admit the grain from either of the bins directly to the elevator, substantially as set forth.

3. The combination, with a grain-elevator permanently fitted into a floating-vessel containing grain-bins, of a water-tight trunk extending below the bottom of the grain-bins, and provided with gates or slides, whereby the grain-elevator is also adapted to use as a water-raiser, substantially as set forth.

Signed by me this 27th day of January, A. D. 1877.

C. W. MILLS.

Witnesses:

GEO. T. PINCKNEY,
CHAS. H. SMITH.